Aug. 7, 1928.
W. H. VIBBER
1,679,452
ELECTRIC GROUNDING CONNECTION
Filed Feb. 6, 1925
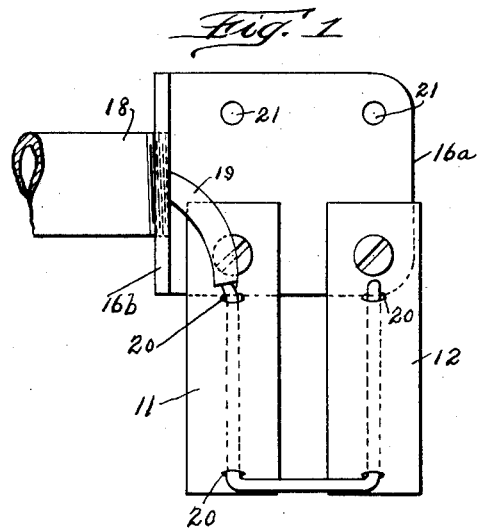
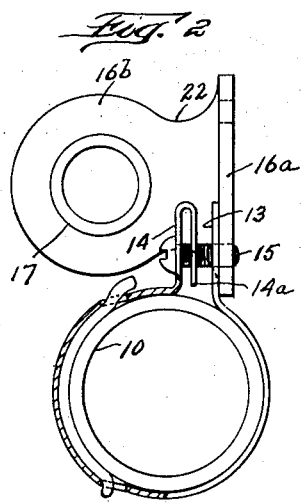
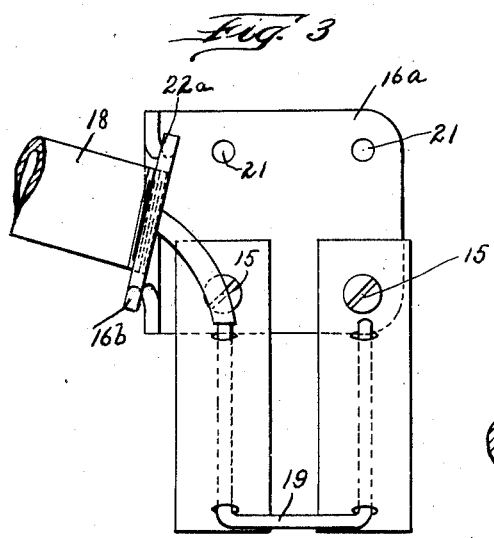
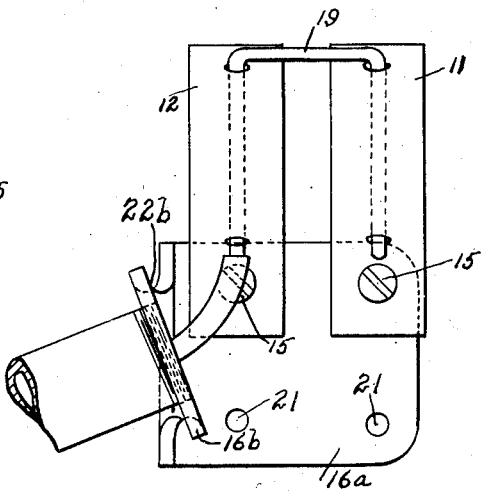
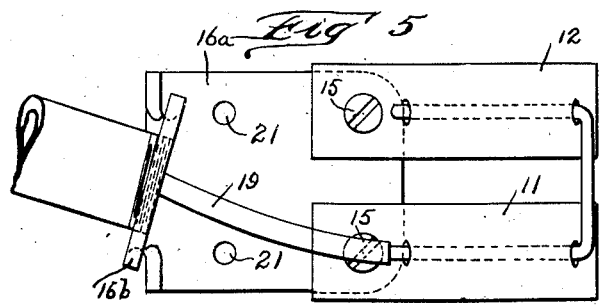
Inventor:
Wheeler H. Vibber Patented Aug. 7, 1928.

1,679,452

UNITED STATES PATENT OFFICE.

WHEELER H. VIBBER, OF NEW LONDON, CONNECTICUT, ASSIGNOR OF ONE-HALF TO THE GILLETTE-VIBBER CO., OF NEW LONDON, CONNECTICUT, A CORPORATION OF CONNECTICUT.

ELECTRIC GROUNDING CONNECTION.

Application filed February 6, 1925. Serial No. 7,374.

This invention relates to ground connections for electric circuits, and more particularly to a fitting adapted to be clamped to a grounded element such as a water pipe or other pipe or rod, and equipped with means for secure and reliable connection to a grounding conduit which may be a conduit encasing one or more grounding wires, or it may be a conduit without such wires. A principal object of the invention is to provide a simple and inexpensive, but strong and reliable device of this kind that is adapted to engage a grounding conduit set at any desired angle with reference to the grounded pipe or element.

The foregoing and other objects and advantages of the invention will more fully appear from the following detailed description taken in connection with the accompanying drawings, and the distinctive features of novelty will be pointed out in the appended claims.

Referring to the drawings:

Fig. 1 is a side elevation of a fitting embodying the invention.

Fig. 2 is an end view thereof with a portion in section.

Fig. 3 is an elevation similar to Fig. 1 illustrating the capability of the device for connecting a grounding conduit with a grounded conduit in angular relation thereto.

Fig. 4 is an elevation similar to Fig. 1 but showing a still further capability of the adjustable fitting of the device to engage conduits at any angle; and Fig. 5 is an elevation showing a still further capability of relative adjustment of parts for the same purpose.

10 indicates a grounded element which may be a water pipe of the usual house-piping system or it may be a pipe or rod especially driven into the ground to constitute a grounding element. 11, 12 denote two clasp bands which are adapted to be clamped to the pipe 10 adjacent one another as shown. For this purpose each clasp band has ears 13, 14 projecting therefrom, one of these ears shown as the ear 14 having a bent-in extremity 14ª. Through these ears a clamp screw 15 is passed, this screw being threaded into one leg or wing 16ª of a bent L-shaped bracket or fixture of stout plate metal. The other leg or wing 16ᵇ of this bracket has a threaded opening 17 therein in which is engaged the end of a grounding conduit 18 which may encase one or more grounding wires 19, one of such wires being shown, though so far as the invention is concerned the grounding wire is not a material element. When such grounding wire is employed it may be passed through apertures 20 of the clasps 11, 12 so that a portion or such wire is caught and held within said clasps to be pressed tightly against the grounded pipe 10 as the clasps are drawn up. The wing portion 16ª of the bracket is provided with a series of spaced apart threaded holes 21, preferably located in adjacent corners of said wing portion and so arranged that the screws 15 of the respective clasps may be secured in any two of such holes at will. Thus as shown in Fig. 1, the two lower holes are thus employed to secure the clasps 11, 12, in depending relation to the bracket, while in Fig. 4, the two upper holes are employed to hold the clasps extending upward from the bracket, and in Fig. 5 the two end holes are employed to hold such clasps extending directly outward from the bracket. This permits the grounding conduit 18 to be secured in a variety of relations to the grounded pipe 10. In accordance with my invention the wing portion 16ᵇ is weakened, e. g., by being reduced in width as indicated at 22, so as to form an intermediate neck portion sufficiently narrow to permit this portion readily to be bent or twisted to a substantial degree with reference to the wing portion 16ª which is clamped to the grounded pipe. Such twisting is indicated at 22ª in Fig. 3 and permits the grounding conduit 18 to be located in any desired angular relation with respect to the grounded pipe,—a different twisted angular position being shown at 22ᵇ in Fig. 4. The present improved fitting thus makes it possible to establish a secure and reliable connection of the grounding conduit to the grounded conduit in any relative positions and angular relation of the grounding conduit with respect to the grounded conduit as may be found necessary or desirable. While especially applicable to grounding connections, the fitting device of the invention is also applicable for use in establishing electric connection between two conduits whether for a grounding connection or otherwise.

I am aware that the invention may be embodied in other specific forms without departing from the spirit or essential attributes thereof, and I therefore desire the present embodiment to be considered in all respects as illustrative and not restrictive reference being had to the appended claims rather than to the foregoing description to indicate the scope of the invention.

Having described my invention, what I claim as new and desire to secure by Letters Patent is:

1. An electric connection comprising a clasp-band adapted to encircle a conductor pipe, a bracket having a portion in which is secured one end of a grounding conduit and another portion adapted to be secured to the clasp-band, and means for securing the bracket to the clasp-band, the bracket having a weakened area between said two portions thereof constructed and arranged to permit distortion of the bracket to adapt it for attachment to the conduit in various angular positions of the latter relatively to the conductor pipe.

2. A connection comprising a clasp-band adapted to encircle a conduit, an L-shaped bracket having one leg provided with a threaded opening to receive a second conduit and another leg adapted to be clamped to the clasp-band, and means for securing the bracket to the clasp-band, one leg of the bracket being connected with the other leg of the bracket by a relatively narrow neck portion enabling said leg readily to be twisted to adapt it for attachment to said second conduit in various angular positions of the latter relatively to the other conduit.

3. The combination with two conduits, of a coupling device comprising a fixture having a portion connected with one of the conduits and another portion connected with the other conduit and a relatively narrow neck connecting said portions of the fixture and enabling said portions easily to be twisted relatively to each other to facilitate adjustment of the fixture to conduits disposed at different angles to one another.

4. For use in electrically connecting two conduits, a fixture comprising two angularly disposed wings one of which is connected with the other by an intermediate relatively narrow portion enabling the said wings readily to be twisted laterally relatively to each other, one of said wings being adapted for attachment to one of said conduits, a clasp-band, and means for detachably securing the clasp-band to the other of said wings and to the conduit.

In testimony whereof I affix my signature.

WHEELER H. VIBBER.